US012697785B2

(12) United States Patent (10) Patent No.: US 12,697,785 B2

Hasific et al. (45) Date of Patent: Aug. 4, 2026

(54) VARIABLE WELD SPACING

(71) Applicant: Georg Fischer Rohrleitungssysteme AG, Schaffhausen (CH)

(72) Inventors: Edin Hasific, Schaffhausen (CH); Mariano Gutierrez, Kreuzlingen (CH); Benedikt Engesser, Hochemmingen (DE); Thomas Waldraff, Bad Dürrheim (DE); Juergen Roesch, Lenzkirch (DE)

(73) Assignee: Georg Fischer Rohrleitungssysteme AG, Schaffhausen (CH)

( * ) Notice: Subject to any disclaimer, the term of this patent is extended or adjusted under 35 U.S.C. 154(b) by 133 days.

(21) Appl. No.: 18/789,889

(22) Filed: Jul. 31, 2024

(65) Prior Publication Data

US 2025/0042098 A1 Feb. 6, 2025

(30) Foreign Application Priority Data

Aug. 2, 2023 (EP) ..................................... 23189129

(51) Int. Cl.
 *B29C 65/00* (2006.01)
 *B29C 65/78* (2006.01)
(52) U.S. Cl.
 CPC ...... *B29C 65/7841* (2013.01); *B29C 66/1142* (2013.01)
(58) Field of Classification Search
 CPC ......................... B29C 65/7841; B29C 65/1142
 See application file for complete search history.

(56) References Cited

U.S. PATENT DOCUMENTS

| | | | | |
|---|---|---|---|---|
| 4,493,150 | A * | 1/1985 | Garcia | B23D 21/04 |
| | | | | 30/97 |
| 4,829,860 | A * | 5/1989 | VanderPol | B23Q 1/4804 |
| | | | | 384/248 |
| 5,865,430 | A * | 2/1999 | Conover | B23K 37/0533 |
| | | | | 29/272 |
| 5,941,145 | A * | 8/1999 | Marshall | B23B 5/163 |
| | | | | 82/131 |
| 6,227,577 | B1 * | 5/2001 | Ikeda | F16L 17/04 |
| | | | | 285/112 |
| 6,619,164 | B1 * | 9/2003 | Ricci | B23Q 9/02 |
| | | | | 82/128 |
| 2015/0059185 | A1 * | 3/2015 | Coakley | B23Q 9/0021 |
| | | | | 30/97 |
| 2021/0016356 | A1 * | 1/2021 | Thompson | B23B 5/08 |

FOREIGN PATENT DOCUMENTS

| | | | |
|---|---|---|---|
| EP | 0453903 | A2 | 10/1991 |
| EP | 2397311 | B1 | 9/2018 |
| JP | 2014-240169 | A | 12/2014 |

* cited by examiner

*Primary Examiner* — Philip C Tucker
*Assistant Examiner* — Nikolas R Harm
(74) *Attorney, Agent, or Firm* — Harness, Dickey & Pierce, P.L.C.

(57) ABSTRACT

Half-shell for the receiving and concentric guidance of a plastic pipe in a butt welding machine, wherein the half-shell has a semi-circular shape with an internal diameter corresponding to the external diameter of the pipe to be received, at least one external diameter in order to be accurately received in a clamping unit of a butt welding machine, a front face, a rear face and a thickness extending axially between the front face and the rear face, wherein at least one spacing element is arranged on the front face and protrudes over the front face in the axial direction.

13 Claims, 3 Drawing Sheets

VARIABLE WELD SPACING

CROSS-REFERENCE TO RELATED APPLICATIONS

This application is based on, and claims the priority from European Patent Application No. 23189129.2, filed on Aug. 2, 2023, the disclosure of which is incorporated herein by reference in its entirety.

FIELD OF THE INVENTION

The invention relates to a half-shell for the receiving and concentric guidance of a plastic pipe in a butt welding machine, preferably in an IR butt welding machine, wherein the half-shell has a semi-circular shape with an internal diameter corresponding to the external diameter of the pipe to be received, at least one external diameter in order to be accurately received in a clamping unit of a butt welding machine, a front face, a rear face, and a thickness extending axially between the front face and the rear face.

BACKGROUND OF THE INVENTION

Half-shells for receiving a pipe in butt welding machines are known and in each case always have to be inserted into the clamping point as far as the corresponding external diameter of the pipe.

JP 2014 240169 A2 discloses such half-shells which are constructed in multiple parts and are inserted into the clamping point for receiving a pipe, whereby the pipe is fixed radially and axially in the butt welding machine.

A drawback here is that in spite of the use of different half-shells for the various pipe dimensions, the spacing from the heating element is always the same, since this is generally defined via an axial stop on the heating element.

EP 0 453 903 A2 discloses stops as four respective cylindrical cams on both sides of the heating element. These cams ensure the spacing from the heating element to the clamping unit or to the pipe end to be heated. As already mentioned above, this spacing is unchangeable and thus is the same size in each pipe irrespective of the pipe diameter, and thus in each welding process irrespective of the dimension and material.

SUMMARY OF THE INVENTION

It is an aspect of the invention to be able to adapt the spacing and welding parameters for heating the pipe in a butt welding machine individually to the pipes to be welded, so that the pipe ends can be heated optimally and in a manner which is as energy-efficient as possible.

This is achieved according to the invention in that at least one spacing element for the receiving and concentric guidance of a plastic pipe is arranged on the half-shell on the front face and protrudes over the front face in the axial direction.

The half-shell according to the invention for the receiving and concentric guidance of a plastic pipe in a butt welding machine, preferably in an IR butt welding machine, has a semi-circular shape with an internal diameter corresponding to the external diameter of the pipe to be received. The half-shell has at least one external diameter in order to be accurately received in a clamping unit of a butt welding machine. The half-shell contains a front face, a rear face and a thickness axially extending between the front face and the rear face. Accordingly, the half-shell is preferably configured as a disk with different diameters and thicknesses and a contour as a semi-circular ring.

The half-shell has at least one spacing element which is arranged on the front face of the half-shell and protrudes over the front face in the axial direction. The spacing element is preferably raised out of the front face of the half-shell and the stop surface of the spacing element is located axially in front of the front face of the half-shell or arranged facing away from the rear face. The spacing element is preferably arranged on the front face of the half-shell and extends in the opposing direction to the rear face or away from the rear face.

Due to this spacing element on the half-shell each spacing from the heating element in the butt welding machine is defined according to the pipe diameter or specifically for a material. Thus the half-shell has not only an internal diameter which is specific to the pipe dimension but also a spacing element which is specific to the pipe dimension and possibly also to the pipe material and which defines the heating spacing from the heating element and correspondingly controls the clamped pipe. In addition, this defines the temperature prevailing at the pipe end due to the distance from the heating element generated by the spacing element. Naturally it is also possible that the butt welding machine selects or stipulates the welding parameters stored in the controller corresponding to the spacing, due to the identification of the spacing which is generated by the spacing element on the half-shell.

It has also been shown to be advantageous if the half-shell is configured to be thicker in the region of the spacing element in the axial direction than the thickness of the half-shell between the front face and the rear face. This ensures that the spacing element protrudes axially over the front face and, when the pipe ends are heated by means of the heating element of the butt welding machine, the heating element is spaced apart axially from the pipe end by the spacing element of the half-shell which is inserted in the clamping unit.

It is advantageous if the thickness between the rear face and the stop surface of the stop element which faces away from the front face is thicker than the thickness between the rear face and the front face.

Preferably, an axial stop shoulder is arranged on the half-shell for the axial positioning and fixing of the half-shell in a clamping unit of a butt welding machine. It is advantageous if this stop shoulder is formed by different external diameters arranged one behind the other in the axial direction, whereby an offset is present on the external diameter of the half-shell. The offset arranged on the half-shell produces an axially defining stop shoulder which prevents the displacement of the half-shell in the clamping unit at least in one direction.

A preferred embodiment is that the spacing element is arranged on the half-shell such that the half-shell placed in a clamping unit is axially defined at least in one direction. This is preferably achieved by the spacing element protruding radially over the front face. In other words, the spacing element protrudes over the external diameter of the front face, whereby the half-shell cannot be displaced in the direction of the rear face.

It is advantageous if the spacing element is configured as a protruding tab. Preferably, the spacing element is arranged integrally or in one piece on the half-shell or the half-shell is configured as a homogenous part. The spacing element is preferably arranged integrally on the half-shell.

It has been shown as advantageous if at least two spacing elements are arranged on the half-shell. Preferably, the spacing elements are arranged so as to be spaced regularly apart along the semi-circular ring.

It has been shown as advantageous if the half-shell has a coding for the identification by the butt welding machine. This has the advantage that, according to the coding, the butt welding machine can autonomously adjust all of the stored settings and parameters which relate to the pipe to be welded and as a result it is possible to avoid in welding operations the error rate which was produced hitherto due to manual input errors.

Preferably, the coding is implemented electronically or mechanically. In other words, the coding can be implemented by means of recesses, an elevation or magnets attached to the half-shell at different positions, and by different material thicknesses, which are then identified by means of a sensor arranged in the clamping unit or welding machine. The coding can also be implemented by an RFID chip or an NFC tag placed in the half-shell, and also the application of a QR code or barcode can be used so that the half-shell is identified by the welding machine so that accordingly the required welding parameters are autonomously adjusted.

It has been shown as advantageous if the half-shell is made from a metallic material or from plastics. Preferably, the half-shell is configured from aluminium.

BRIEF DESCRIPTION OF THE DRAWINGS

An exemplary embodiment of the invention is described with reference to the figures, wherein the invention is not only limited to the exemplary embodiment. In the figures.

EXEMPLARY EMBODIMENTS

Figure 1:
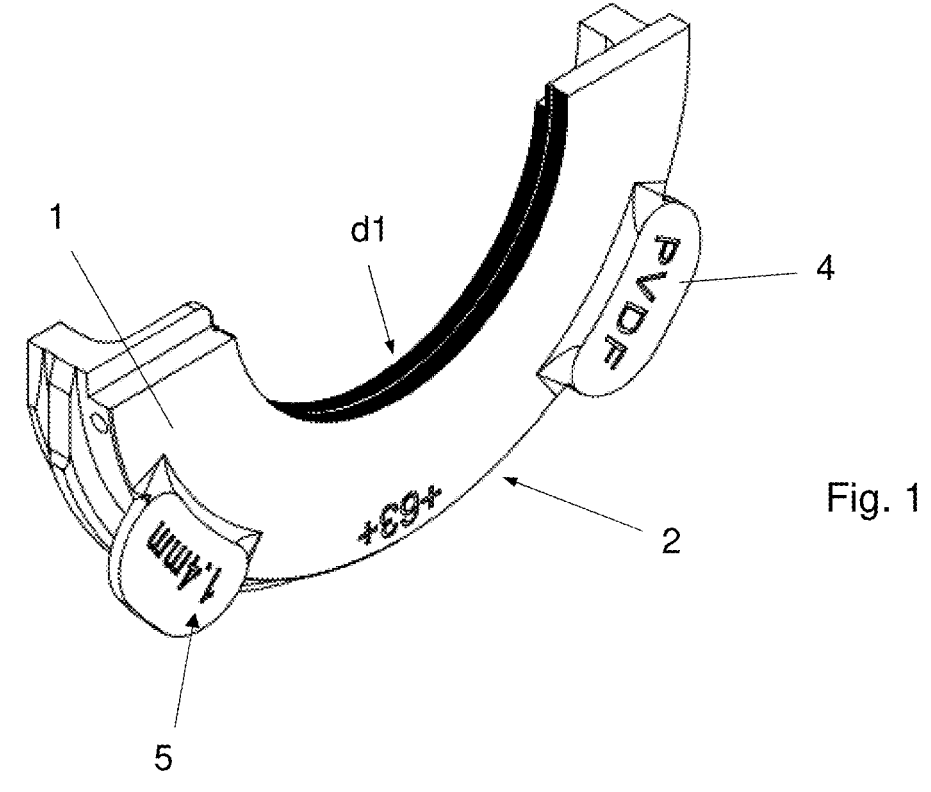
FIG. 1 shows a three-dimensional view of a half-shell according to the invention from the front.
Figure 2:
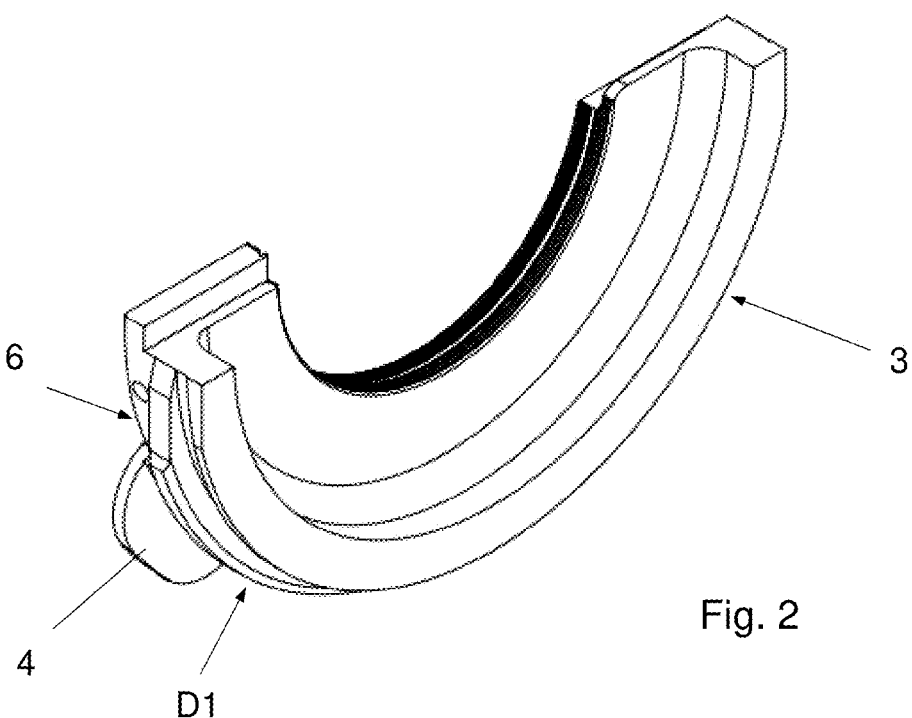
FIG. 2 shows a three-dimensional view of a half-shall according to the invention from the rear.
Figure 3:
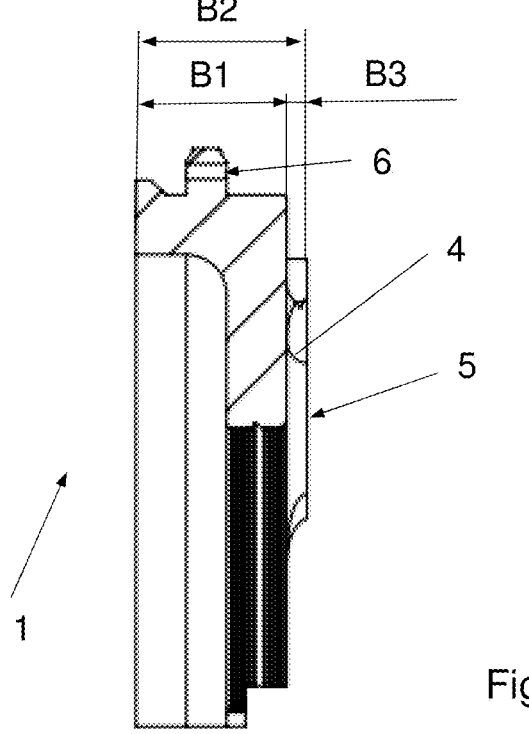
FIG. 3 shows a sectional view through a half-shell according to the invention and FIG. 4 shows a schematic view of half-shells according to the invention installed in clamping units with the heating element arranged therebetween.
Figure 4:
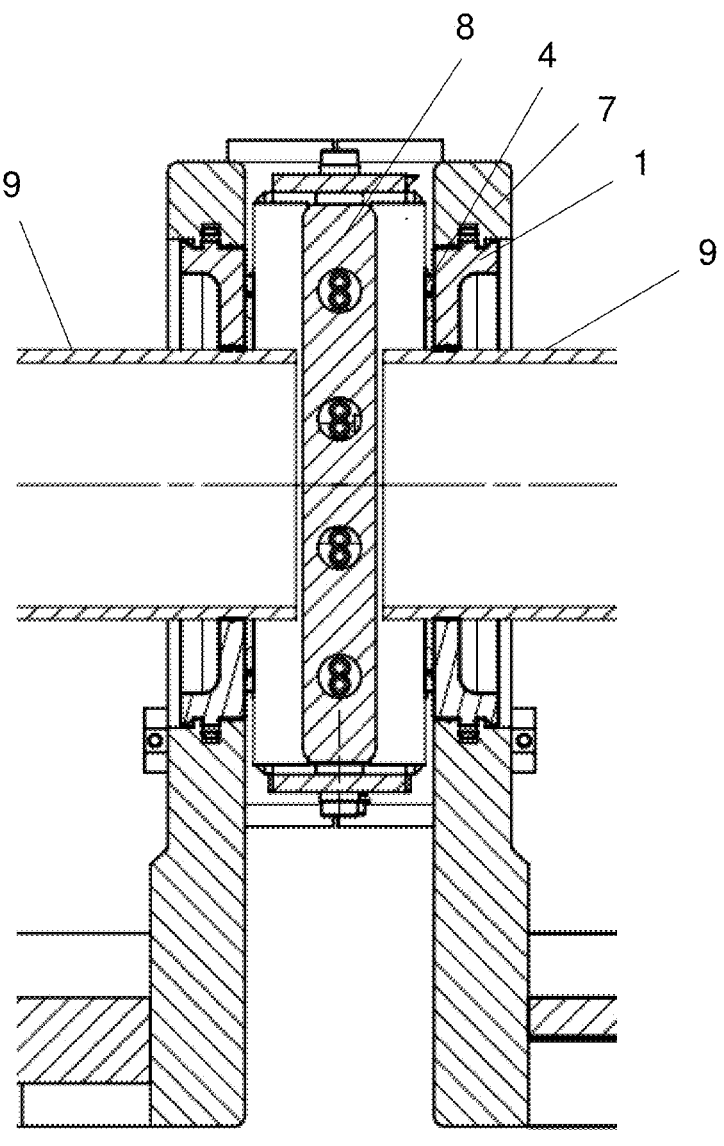

The drawing shown in FIG. 1 shows a half-shell 1 according to the invention for the receiving and concentric guidance of a plastic pipe 9 in a butt welding machine, visible in FIG. 4. The half-shell 1 has a semi-circular shape which has an internal diameter d1 which corresponds to the external diameter of the plastic pipe 9 to be welded. The half-shell 1 has an external diameter D1 in order to be received accurately in a clamping unit 7 of a butt welding machine. Two identical half-shells 1 which enclose the plastic pipe 9 are installed opposing one another in each clamping unit 7. The half-shell 1 has a front face 2 which in the installed state in a clamping unit 7 is oriented in the direction of the heating element 8. The rear face 3 of the half-shell 1 is located on the opposing side of the front face 2. The thickness B1 of the half-shell 1 extends axially between the front face 2 and the rear face 3 of the half-shell 1. The half-shell 1 preferably has different stepped portions in the internal and external diameters. The half-shell 1 has on the front face 2 at least one spacing element 4 which protrudes over the front face 2 in the axial direction. In the installed state of the half-shell 1, the spacing element 4 is located between the heating element 8 and the front face 2 of the half-shell 1 or the clamping unit 7 to which it is integrally connected, or the spacing element 4 and the half-shell 1 together form one component. This arrangement of the spacing element 4 between the heating element 8 and the half-shell 1 is clearly visible in FIG. 4, wherein the spacing element 4 forms the defined spacing corresponding to the pipe 9 to be heated. In other words, a half-shell 1 is selected according to the external diameter of the pipe 9, said half-shell having the corresponding internal diameter d1 and at the same time a correspondingly thick spacing element 4 in order to ensure the required spacing between the heating element 8 and the half-shell 1 or the clamping unit 7. Moreover, the material and the wall thickness of the pipe 9 to be welded can also have an influence on the thickness of the spacing element 4, whereby half-shells 1 which have identical internal diameters d1 but different thicknesses of the spacing element 4 and thus different thicknesses B2 between the stop surface 5 of the spacing element 4 and the rear face 3 can be present as a range of products. Preferably, the half-shell 1 has two spacing elements 4 which are arranged so as to be distributed regularly along the front face 2. Naturally, a different number is also conceivable. In FIG. 3 it is clearly visible that the thickness B1 of the half-shell between the front face 2 and the rear face 3 is smaller than the thickness B2 between the rear face 3 and the stop surface 5 of the spacing element 4. So that the half-shell 1 is axially positioned and fixed in the clamping unit 7, the half-shell 1 has a stop shoulder 6 which prevents the axial displacement of the half-shell 1 at least in one direction. Preferably, the stop shoulder 6 is formed by stepped portions in the external diameters D1. The spacing elements 4 are preferably configured as tabs and protrude radially over the external diameter D1. As a result, the half-shell 1 cannot be displaced at least in one direction. Preferably, the half-shell 1 is axially fixed in both directions by the stop shoulder 6 and the tab. Codings are attached to the half-shell for the identification of the half-shell 1 by the welding machine, the codings being identified by a sensor in the welding machine or clamping unit 7. The codings can be mechanical and/or electronic, but this cannot be identified in the figures. Naturally, the coding can also be such that the welding machine identifies the thickness B3 of the spacing element 4 or even the thickness B2 between the stop surface 5 of the spacing element 4 and the rear face 3.

The invention claimed is:

1. A half shell for receiving and concentric guidance of a plastic pipe in a butt welding machine, comprising wherein the half-shell has a semi-circular shape with an internal diameter configured to be corresponding to an external diameter of the pipe to be received, at least one external diameter in order to be accurately received in a clamping unit of a butt welding machine, a front face, a rear face and a thickness extending axially between the front face and the rear face, wherein at least one spacing element is arranged on the front face and protrudes over the front face in the axial direction; and wherein an axial stop shoulder is arranged on the half-shell for the axial positioning and fixing of the half-shell in a clamping unit of a butt welding machine.

2. The half-shell according to claim 1, wherein the half-shell is configured to be thicker in a region of the at least one spacing element in the axial direction than the thickness of the half-shell between the front face and the rear face.

3. The half-shell according to claim 1, wherein the at least one spacing element is arranged on the half-shell such that the half-shell arranged in a clamping unit is axially defined at least in one direction.

4. The half-shell according to claim 1, wherein at least two spacing elements are arranged on the half-shell.

5

6

5. The half-shell according to claim 1, wherein the at least one spacing element is configured as a tab.

6. The half-shell according to claim 1, wherein the at least one spacing element protrudes radially over the external diameter.

7. The half-shell according to claim 1, wherein the half-shell has a coding serving to identify of the half-shell by a butt welding machine.

8. The half-shell according to claim 7, wherein the coding is electronic and/or mechanical.

9. The half-shell according to claim 1, wherein the half-shell is made from a metallic material or from plastics.

10. The half-shell according to claim 1, wherein the half-shell is made from aluminium.

11. A half shell for receiving and concentric guidance of a plastic pipe in a butt welding machine, comprising wherein the half-shell has a semi-circular shape with an internal diameter configured to be corresponding to an external diameter of the pipe to be received, at least one external diameter in order to be accurately received in a clamping unit of a butt welding machine, a front face, a rear face and a thickness extending axially between the front face and the rear face, wherein at least one spacing element is arranged on the front face and protrudes over the front face in the axial direction; and wherein the at least one spacing element protrudes radially over the external diameter.

12. A half shell for receiving and concentric guidance of a plastic pipe in a butt welding machine, comprising wherein the half-shell has a semi-circular shape with an internal diameter configured to be corresponding to an external diameter of the pipe to be received, at least one external diameter in order to be accurately received in a clamping unit of a butt welding machine, a front face, a rear face and a thickness extending axially between the front face and the rear face, wherein at least one spacing element is arranged on the front face and protrudes over the front face in the axial direction; and wherein the half-shell has a coding serving to identify the half-shell by a butt welding machine.

13. The half-shell according to claim 12, wherein the coding is electronic and/or mechanical.

\* \* \* \* \*